(12) United States Patent
Ng et al.

(10) Patent No.: US 7,582,130 B2
(45) Date of Patent: Sep. 1, 2009

(54) COALESCING FILTER ASSEMBLY

(75) Inventors: Kwok-Lam Ng, Madison, WI (US); Roger Zoch, McFarland, WI (US); Brian Schwandt, Atkinson, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 433 days.

(21) Appl. No.: 11/279,849

(22) Filed: Apr. 14, 2006

(65) Prior Publication Data
US 2007/0240392 A1 Oct. 18, 2007

(51) Int. Cl.
*B01D 46/00* (2006.01)
(52) U.S. Cl. .................. 55/385.3; 55/419; 55/482; 55/484; 55/502; 55/510; 55/521; 55/323; 55/330; 55/350.1; 55/413; 55/481; 123/198 E
(58) Field of Classification Search .......... 55/385.3, 55/419, 482, 484, 502, 510, 521, 323, 330, 55/350.1, 413, 481; 123/198 E
See application file for complete search history.

(56) References Cited

U.S. PATENT DOCUMENTS

| | | | |
|---|---|---|---|
| 2,252,242 A | 8/1941 | Wood | 183/24 |
| 4,861,359 A * | 8/1989 | Tettman | 55/419 |
| 5,438,965 A | 8/1995 | Aronsson et al. | 123/198 |
| 5,902,362 A * | 5/1999 | Paoluccio | 55/418 |
| 6,143,049 A * | 11/2000 | Gieseke et al. | 55/385.3 |
| 6,247,463 B1 | 6/2001 | Fedorowicz et al. | |
| 6,279,556 B1 | 8/2001 | Busen et al. | |
| 6,290,738 B1 | 9/2001 | Holm | |
| 6,309,436 B1 * | 10/2001 | Holch | 55/337 |
| 6,354,283 B1 | 3/2002 | Hawkins et al. | |
| 6,478,018 B2 | 11/2002 | Fedorowicz et al. | |
| 6,478,019 B2 | 11/2002 | Fedorowicz et al. | |
| 6,505,615 B2 | 1/2003 | Pietschner | |
| 6,599,350 B1 | 7/2003 | Rockwell et al. | 96/135 |
| 6,626,163 B1 | 9/2003 | Busen et al. | |
| 6,684,864 B1 | 2/2004 | Busen et al. | |
| 6,858,051 B2 * | 2/2005 | Uhlenbrock | 55/321 |
| 7,186,282 B2 * | 3/2007 | Su | 55/330 |
| 7,238,216 B2 | 7/2007 | Malgorn et al. | |
| 2004/0040272 A1 * | 3/2004 | Uhlenbrock | 55/423 |
| 2006/0032486 A1 * | 2/2006 | Prasad | 123/572 |
| 2006/0059875 A1 * | 3/2006 | Malgorn et al. | 55/468 |
| 2006/0062699 A1 | 3/2006 | Evenstad et al. | |

(Continued)

FOREIGN PATENT DOCUMENTS

WO WO03/082432 10/2003

*Primary Examiner*—Duane Smith
*Assistant Examiner*—Minh-Chau T Pham
(74) *Attorney, Agent, or Firm*—Andrus, Sceales, Starke & Sawall, LLP; J. Bruce Schelkopf (57) ABSTRACT

A coalescing filter assembly having an upstream chamber, a downstream chamber, and a weephole connecting the upstream chamber to the downstream chamber. The downstream chamber includes a coalescing filter to filter a flow of gases. A passageway may be implemented between the upstream chamber and the downstream chamber to accommodate the flow of gases therethrough, while the weephole enables liquid to seep from the upstream chamber to the downstream chamber. In this manner, the weephole reduces liquid pooling in the upstream chamber without substantially compromising the efficiency or performance of the coalescing filter. A drain may connect to the downstream chamber to drain liquid collected therein.

20 Claims, 6 Drawing Sheets

U.S. PATENT DOCUMENTS

2006/0086649 A1  4/2006  Wieczorek et al.
2006/0124117 A1  6/2006  Knauf et al.
2007/0240392 A1  10/2007  Ng et al.
2007/0256566 A1* 11/2007  Faber et al. .................. 96/417

* cited by examiner

COALESCING FILTER ASSEMBLY

BACKGROUND OF THE INVENTION

1. Field of the Invention

This invention relates to filtration systems, and more particularly relates to a coalescing filter assembly to reduce liquid pooling therein.

2. Description of the Related Art

Diesel engines require less maintenance and generate energy more efficiently, with less carbon dioxide emissions, than gasoline-powered engines. As a result, more than thirteen million diesel engines in the United States provide power for a wide range of vehicles and equipment including heavy-duty trucks, buses, trains, large ships, electricity generators, excavators, cranes, and agricultural equipment.

Diesel emissions, however, are more harmful to human health on a per-vehicle basis than emissions from similar gasoline-powered engines. Indeed, even though diesels comprise only about five percent (5%) of on-road vehicles in the United States, on-road diesels released 3.4 million tons of nitrogen oxides ($NO_x$) in 2002, accounting for thirteen percent (13%) of all U.S. $NO_x$ emissions.

Accordingly, the Environmental Protection Agency ("EPA") has finalized regulations requiring substantially more stringent emissions limits for on-road heavy-duty diesel engines, where crankcase gases are included as part of the regulated diesel engine emissions. While various types of filters have been engine-mounted in tight spaces for many years, the new EPA emissions regulations require that crankcase ventilation systems, exhaust gas recirculation ("EGR") systems, and other components also be engine-mounted.

Engine surface space is inherently limited. Accordingly, compliance with the new EPA emissions regulations requires that engine-mounted devices overcome challenging packaging and mounting constraints. For example, conventional coalescing filter assemblies include void spaces in front of the filter element that tend to collect oil and other liquid and solid contaminants before filtration. The volume of liquid collected in those spaces may flood portions of the filter and cause oil leakage during vehicle operation. Additionally, liquid accumulated in such voids may spill out when the filter is replaced or the engine is otherwise serviced, rendering otherwise simple servicing procedures both difficult and messy. These problems are exacerbated by the increasingly limited working space available for accessing engine-mounted devices subject to the new EPA regulations.

What is needed is thus an engine-mounted coalescing filter assembly that reduces oil leaks and spills during operation and servicing while substantially maintaining filter performance and efficiency. Beneficially, such an engine-mounted coalescing filter assembly would also facilitate mounting and packaging requirements under the new EPA regulations. Such a coalescing filter assembly is disclosed and claimed herein.

SUMMARY OF THE INVENTION

The present invention has been developed in response to the present state of the art, and in particular, in response to the problems and needs in the art that have not yet been fully solved by currently available coalescing filtration systems. Accordingly, the present invention has been developed to provide a coalescing filtration system that overcomes many or all of the above-discussed shortcomings in the art.

A coalescing filter assembly to reduce liquid pooling therein in accordance with certain embodiments of the present invention includes a coalescing filter having an upstream chamber, a downstream chamber, and a weephole connecting the upstream chamber to the downstream chamber. The coalescing filter is adapted to filter a gaseous stream in a direction from the upstream chamber to the downstream chamber, and may include a passageway to accommodate the gaseous stream. A coalescing filter medium may reside within the downstream chamber to filter the gaseous stream and coalesce liquid therefrom.

The weephole, measuring between about one and about five millimeters in diameter, may function to enable liquid pooling in the upstream chamber to seep to the downstream chamber. In one embodiment, the upstream chamber includes a perforated partition to slow a velocity of the gaseous stream as it enters the upstream chamber. The perforated partition includes a channel to enable liquid to seep through the partition to communicate with the weephole. The liquid may then drain from the downstream chamber to, for example, an engine crankcase, by way of a drain connected to the downstream chamber.

A system of the present invention is also presented to reduce liquid pooling therein. The system may be embodied by an upstream chamber, a downstream chamber, a passageway, a filter medium, and a weephole. As in the coalescing filter assembly, the passageway connects the upstream chamber to the downstream chamber and accommodates the flow of gases. The filter medium resides within the downstream chamber to filter the gases as they flow through the passageway.

The weephole connects the upstream chamber to the downstream chamber to enable liquid pooling in the upstream chamber to seep to the downstream chamber. In one embodiment, a drain connects the downstream chamber to an engine crankcase to direct liquid collected in the downstream chamber to the crankcase. In another embodiment, the upstream chamber includes a perforated partition that includes a channel to enable liquid to seep through the partition to communicate with the weephole.

A method of the present invention is also presented to reduce liquid pooling in a coalescing filter assembly. In one embodiment, the method includes providing an upstream chamber and a downstream chamber, connecting the upstream chamber to the downstream chamber via a passageway, and engaging within the downstream chamber a filtration medium to filter gases flowing through the passageway. The method further includes forming within the upstream chamber a weephole to enable liquid pooling in the upstream chamber to seep from the upstream chamber to the downstream chamber.

In certain embodiments, the method further includes sizing the weephole to a diameter in a range between about one and about five millimeters. The method may also include coupling to the downstream chamber a drain to enable liquid collected in the downstream chamber to drain therefrom. In one embodiment, the method includes partitioning the upstream chamber to slow a velocity of gases entering the upstream chamber and forming within the partition a channel to enable liquid to seep through the partition to communicate with the weephole.

In an alternative embodiment, a method to reduce liquid pooling in a coalescing filter includes introducing a gaseous stream to an upstream chamber in a coalescing filter assembly. The method further includes directing the gaseous stream from the upstream chamber to a downstream chamber via a passageway connecting the upstream chamber to the downstream chamber. Further steps of the method include filtering the gaseous stream flowing through the passageway and enabling liquid pooling in the upstream chamber to seep through a weephole connecting the upstream chamber to the downstream chamber.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are disclosed to provide a thorough understanding of embodiments of the present invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used in this specification, the term "coalesce" refers to a process in which a gaseous suspension of fine solid or liquid particles comes in contact with fibers in a filter media, the suspended particles combine with other collected particles, and the combined particles emerge as a droplet on a downstream surface of the media. The term "coalescing filter" or simply "filter" refers to a filter or other high efficiency separator capable of removing entrained liquid aerosols and other fine contaminants from a gaseous stream. The term "gaseous stream" or "gases" refers to air, combustion off or blow-by gases, crankcase gases, or other carrier gases for aerosols known to those in the art.

Figure 1:
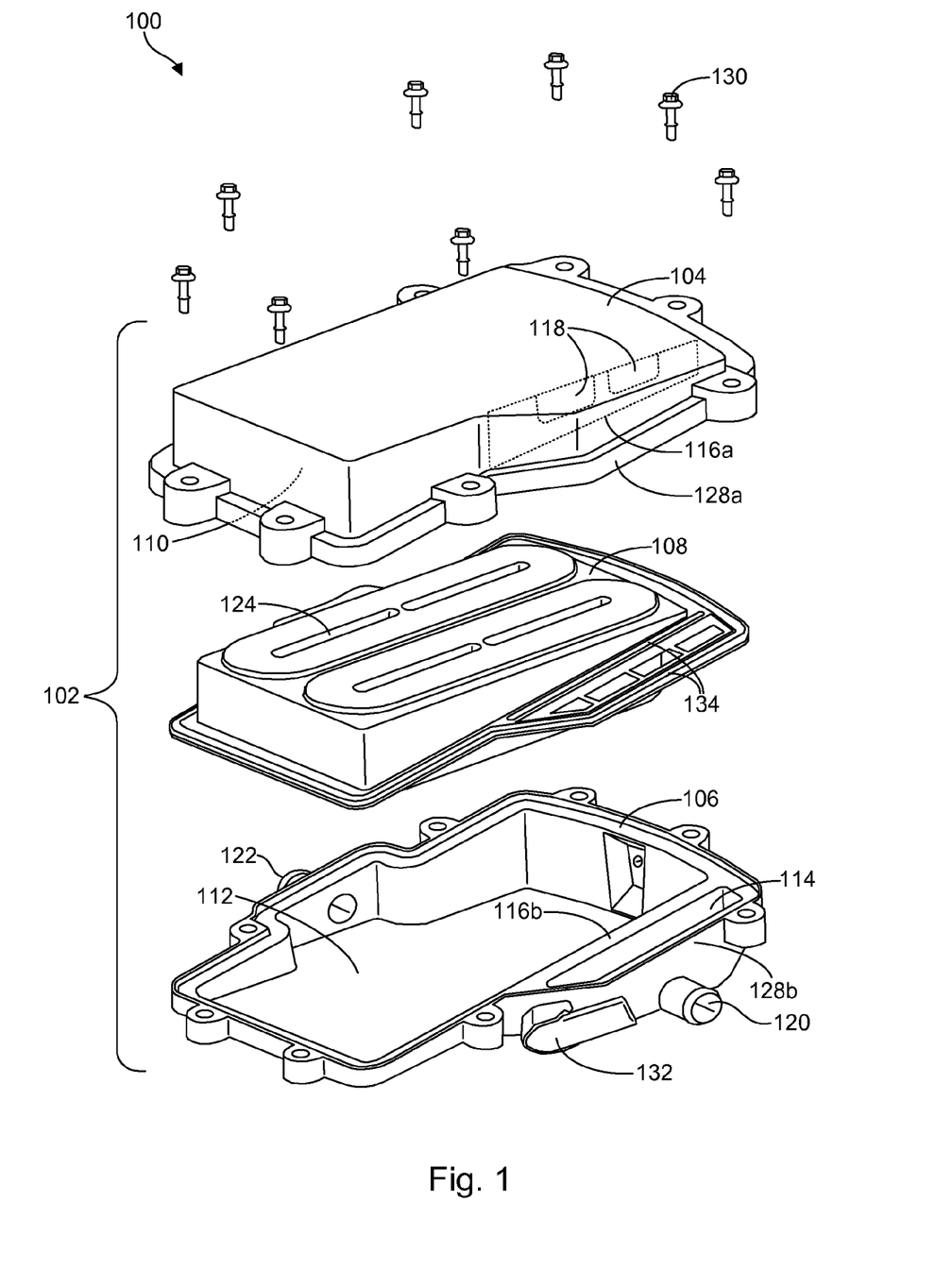
FIG. 1 is a perspective view of coalescing filter assembly constituents in accordance with certain embodiments of the present invention.

Referring now to FIG. 1, a coalescing filter assembly 100 in accordance with the present invention may comprise a housing 102 adapted to reduce liquid pooling on an upstream side of a coalescing filter disposed therein. In one embodiment, the housing 102 comprises a three-part assembly including a cover 104, a base 106 and a divider 108. The divider 108 may substantially divide the space between the cover 104 and the base 106, forming an upstream chamber 110 substantially disposed between the cover 104 and the divider 108, and a downstream chamber 112 substantially disposed between the divider 108 and the base 106. A coalescing filter medium (not shown) may reside within the downstream chamber 112 to filter a gaseous stream.

The gaseous stream may be introduced to the housing 102 by way of an inlet 120 in communication with the upstream chamber 110. The inlet 120 may be integrated into a wall 128 of the housing 102. In certain embodiments, the inlet 120 may further communicate with a source of unfiltered aerosol, such as the engine crankcase (not shown).

In one embodiment, the upstream chamber 110 includes an access chamber 114 immediately adjacent the inlet 118. The access chamber 114 may be defined by corresponding walls 128a, 128b of each of the cover 104 and base 106 elements, as well as by corresponding partitions 116a, 116b integrated into the cover 104 and base 106. A junction between corresponding walls 128a, 128b and corresponding partitions 116a, 116b may be mediated by seals 134 integral to the divider 108. Alternatively, the access chamber 114 may be defined by a unitary partition 116 between the cover 104 and the base 106, by an independent chamber in remote communication with the upstream chamber 110, or by any other means known to those in the art.

In certain embodiments, the base partition 116b may be substantially impervious to the gaseous stream, while the cover partition 116a may include perforations 118 directing the gaseous stream into the upstream chamber 110. In this manner, the access chamber 114 may function to slow a velocity of incoming gases entering the upstream chamber 110.

In some embodiments, the combined partition 116 may also function to substantially isolate incoming gases to facilitate a pressure reading of gases within the access chamber 114. Indeed, in some embodiments a pressure gauge 132 may be integrated into the housing 102 to communicate with the access chamber 114. The pressure reading obtained from the access chamber 114 may be applied to approximate a pressure within, for example, the engine crankcase or other ancillary source of incoming gases, as well as to determine a pressure within the access chamber 114 itself.

The divider 108 may comprise one or more passageways 124 to facilitate a flow of gases between the upstream chamber 110 and the downstream chamber 112. As previously mentioned, a coalescing filter medium (not shown) may reside within the downstream chamber 112 and, in some embodiments, may be coupled to the divider 108. In this manner, the coalescing filter medium may filter a gaseous stream flowing through the passageway 124 in a direction from the upstream chamber 110 to the downstream chamber 112. An outlet 122 may be integrated into the housing 102 and communicate with the downstream chamber 112 to enable filtered gases to exit the coalescing filter assembly 100.

The divider 108 may be retained between the cover 104 and base 106 by pressure, or by any other means known to those in the art. Similarly, the cover 104 may attach to the base 106 by any attachment means known to those in the art. In one embodiment, the cover 104 may be bolted to the base 106, and the divider 108 clamped therebetween.

Figure 2:
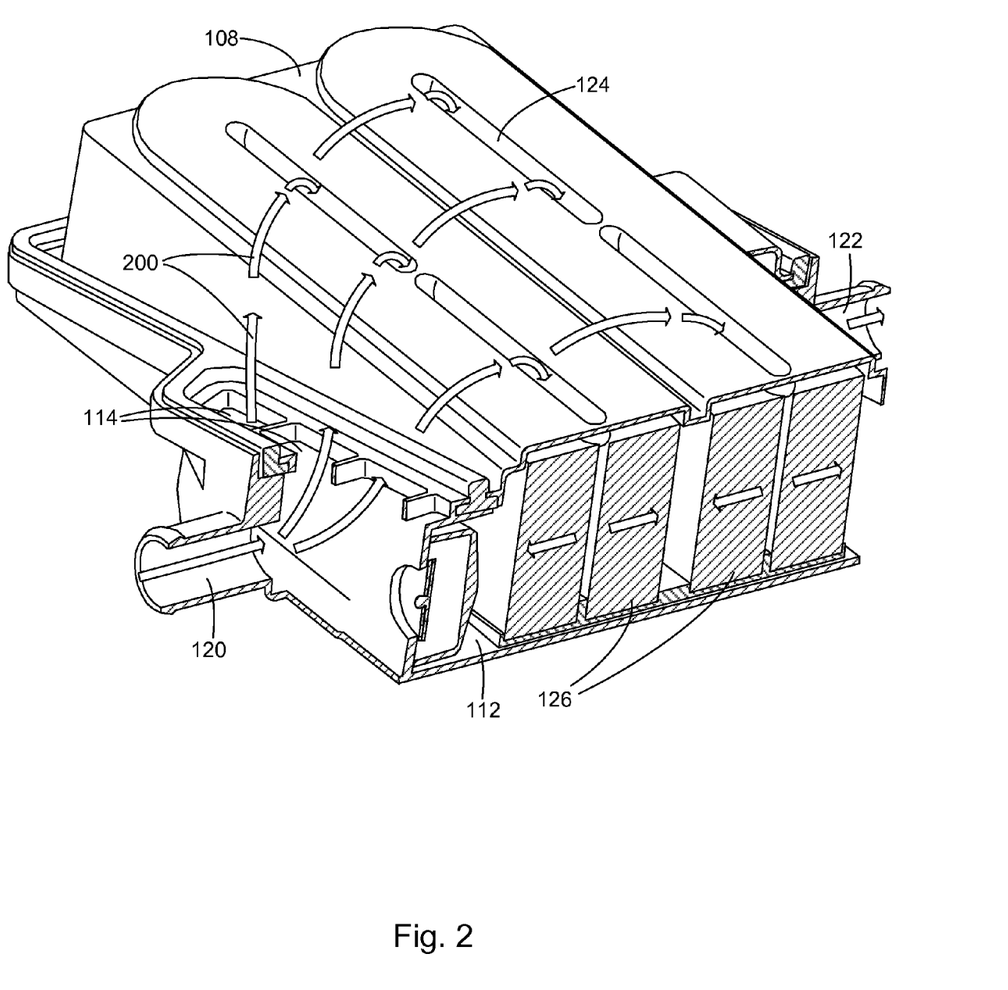
FIG. 2 is a cross-sectional perspective view of the internal components of a coalescing filter assembly depicting the directional flow of gas therethrough.

Referring now to FIG. 2, gases may flow across the coalescing filter assembly 100 of the present invention in a direction from inlet 120 to outlet 122. Specifically, the inlet 120 may focus gases originating from an ancillary device or location, such as from an engine crankcase (not shown), to form a gaseous stream 200. Where the coalescing filter assembly 100 includes an access chamber 114, the gaseous stream 200 may proceed from the inlet 120 to the upstream chamber 110 via the access chamber 114. As discussed above, a partition 116 forming a portion of the access chamber 114 may include perforations 118 enabling the gaseous stream 200 to exit the access chamber 114 to the upstream chamber 110. In other embodiments, the gaseous stream 200 may flow directly from the inlet 120 to the upstream chamber 110.

A passageway 124 integrated into the divider 108 may enable the gaseous stream 200 to enter the downstream chamber 112. A coalescing filter medium 126 disposed within the downstream chamber 112 may filter a flow of the gaseous stream 200 as it traverses the passageway 124. The filtered gaseous stream 200 may then exit the coalescing filter assembly 100 of the present invention through the outlet 122.

Figure 3:
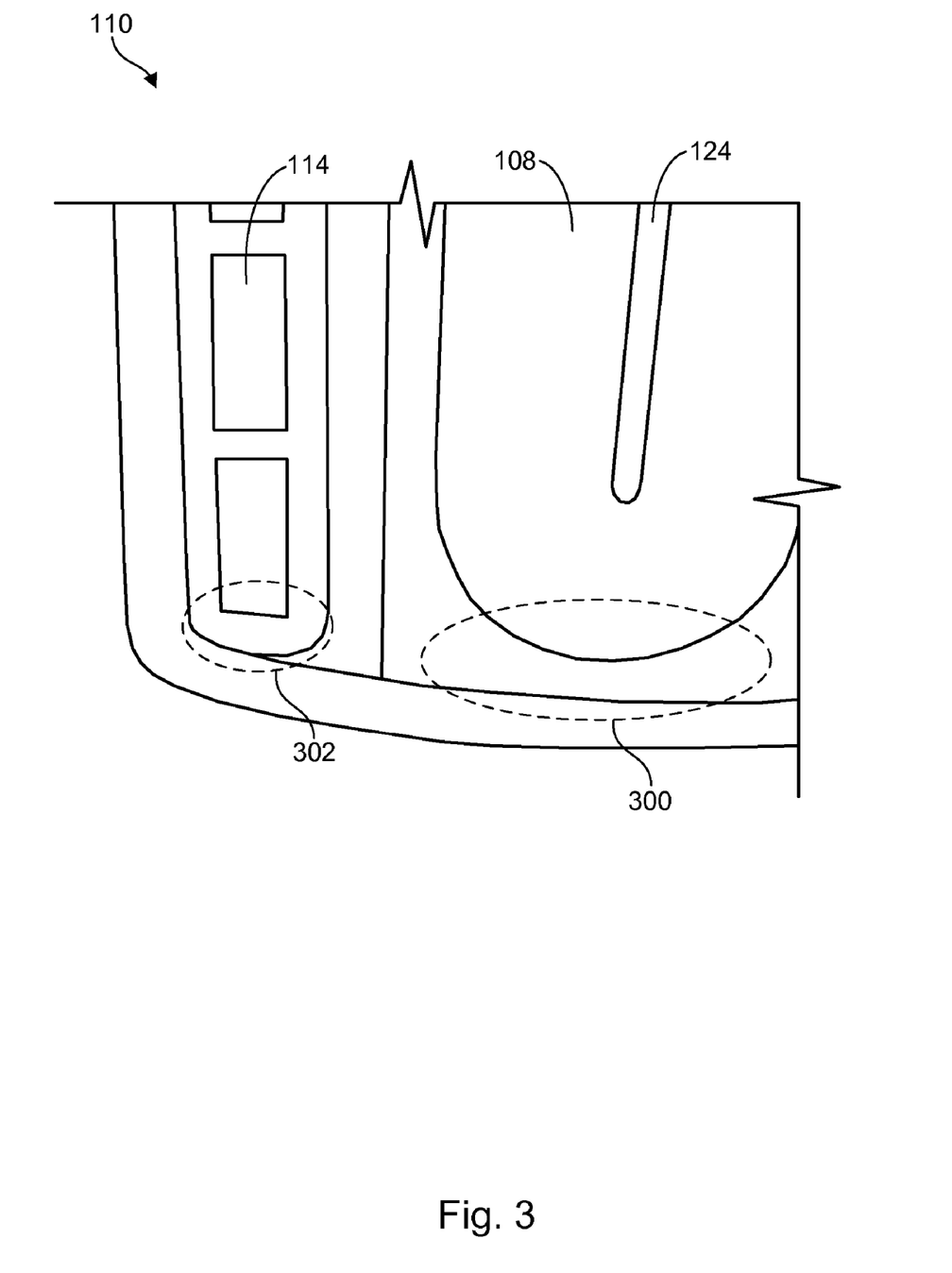
FIG. 3 is a cross-sectional view of a coalescing filter assembly in accordance with the present invention showing areas prone to liquid pooling.

Traditionally, the flow of gases through a coalescing filter assembly 100 as outlined above has resulted in gravitational pooling of liquid upstream of the coalescing filter medium 126. Referring now to FIG. 3, the areas of the coalescing filter assembly 100 particularly susceptible to upstream liquid pooling include a first area 300 located below a passageway 124 integrated into the divider 108, and a second area 302 located in a lower portion of the access chamber 114.

The first area 300 may collect liquid as a result of microdroplet condensation on an upstream side of the divider 108. In one embodiment, the divider 108 includes multiple elongate passageways 124 providing crankcase gases access to a coalescing filter medium 126 located in the downstream chamber 112. Gases entering the passageways 124 may be heavy laden with oil and other heavy hydrocarbons. Indeed, while fuel gas from the engine is typically well dispersed before it settles, crankcase gases are typically much less dilute and may create local areas of high concentration. As a result, microdroplets of oil and other liquid and particulate matter may coat the divider 108 and passageways 124 as the gases come in contact therewith. The microdroplets may accumulate in a first area 300 defined by a lower portion of the upstream chamber 110, potentially flooding the passageways 124 and/or the coalescing filter medium 126 in contact therewith.

The second area 302 may collect liquid in a similar manner. For example, in another embodiment, gases entering the access chamber 114 may be saturated with oil and other liquid or particulate contaminants. The oil and other contaminants may condense onto the partition 116 and/or other walls of the access chamber 114, finally pooling in the second area 302. Such pooling may cause messy spills when the coalescing filter medium 126 is replaced or the coalescing filter assembly 100 is otherwise serviced.

Figure 4:
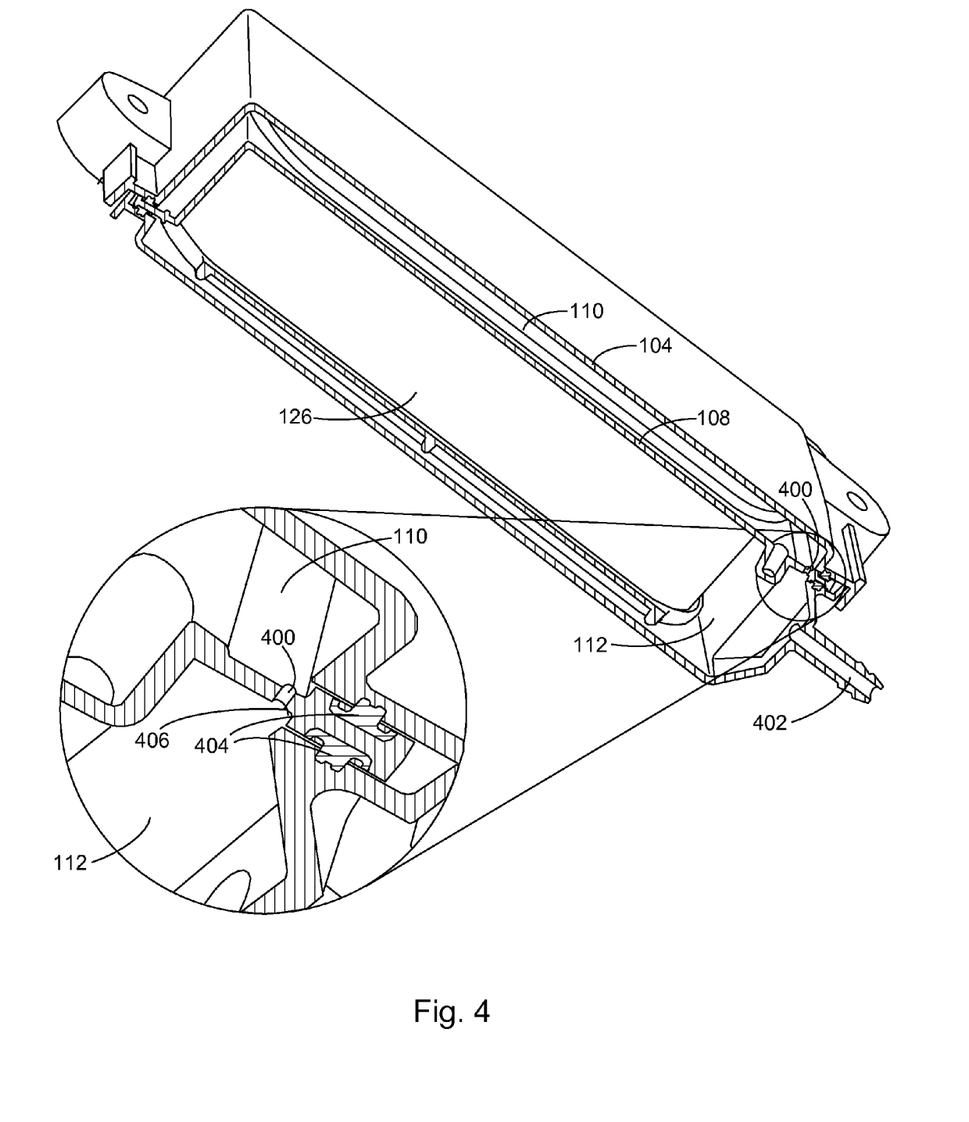
FIG. 4 is a cross-sectional perspective view of one embodiment of a weephole integrated into a coalescing filter assembly in accordance with the present invention.

Referring now to FIG. 4, a weephole 400 may be provided in the divider 108 to enable an accumulation of liquid in the first area 300 to seep from the upstream chamber 110 to the downstream chamber 112. In this manner, the weephole 400 may reduce filtration inefficiencies resulting from liquid flooding portions of the passageway 124 and coalescing filter medium 126.

The weephole 400 may comprise a diameter between about one and about five millimeters, where the diameter of the weephole 400 may be selected to facilitate liquid seepage while limiting filter inefficiencies resulting from gases circumventing the passageways 124 and coalescing filter medium 126. In one embodiment, the weephole 400 may be formed substantially adjacent to seals 404 sealing a bottom edge 406 of the divider 108 between the cover 104 and base 106. In other embodiments, the weephole 400 may be located proximate a bottom edge 406 of the divider 108, or in any other location known to those in the art.

In one embodiment, the bottom edge 406 of the divider 108 substantially corresponds to a bottom edge of the upstream chamber 110 and is substantially arc-shaped, with the lowest point of the arc substantially corresponding to the position of the weephole 400. This design promotes efficient disposal of liquid accumulation into the downstream chamber 112. Indeed, liquid accumulation from the gaseous stream may collect towards the weephole 400 and seep through the weephole 400 to the downstream chamber 112. In some embodiments, a drain 402 may be coupled to the downstream chamber 112 to empty liquid collected therein to an engine crankcase or other external location known to those in the art.

Figure 5:
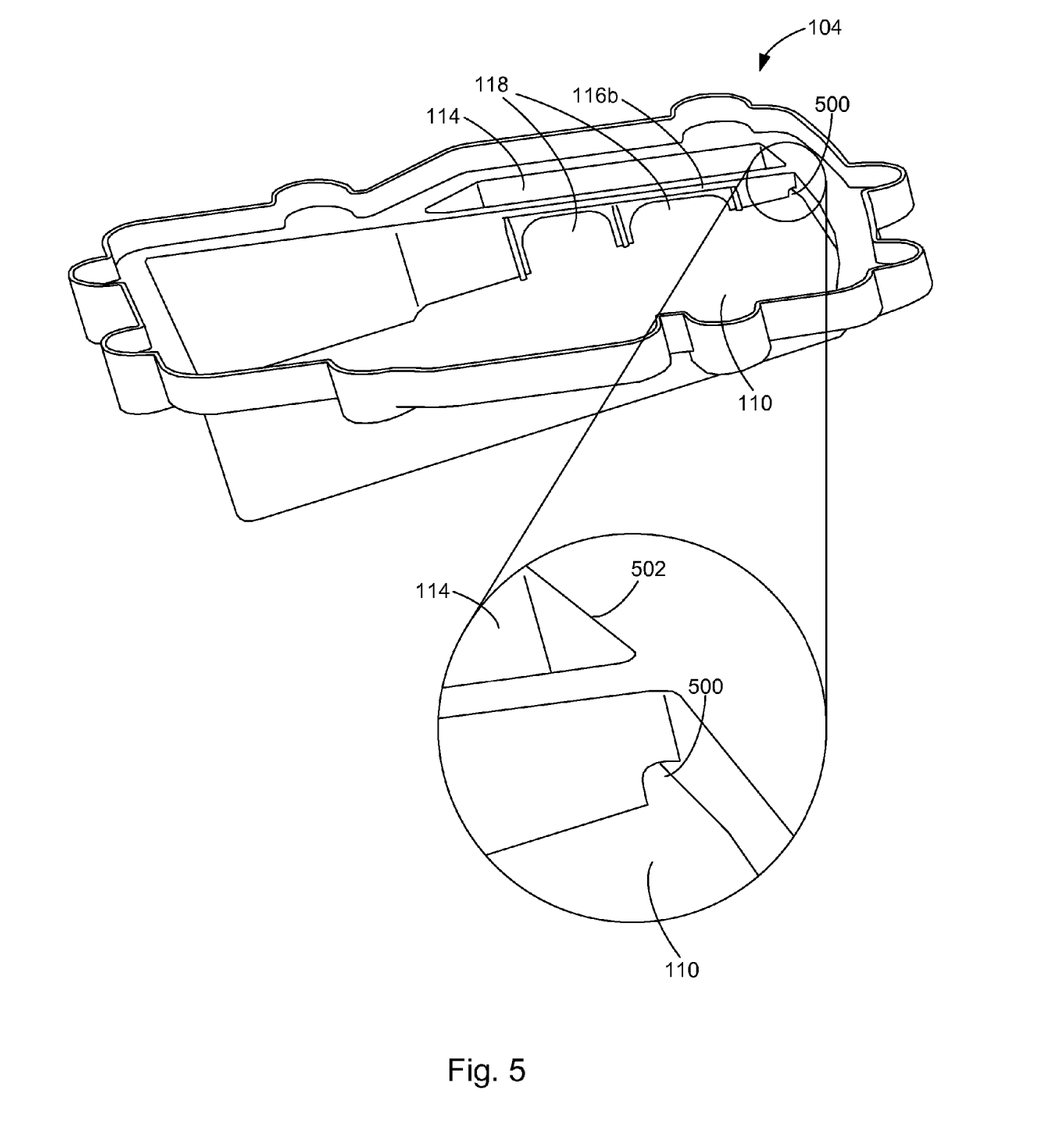
FIG. 5 is a perspective view of an inverted cover showing a channel integrated between the access chamber and the upstream chamber in accordance with the present invention.
Figure 6:
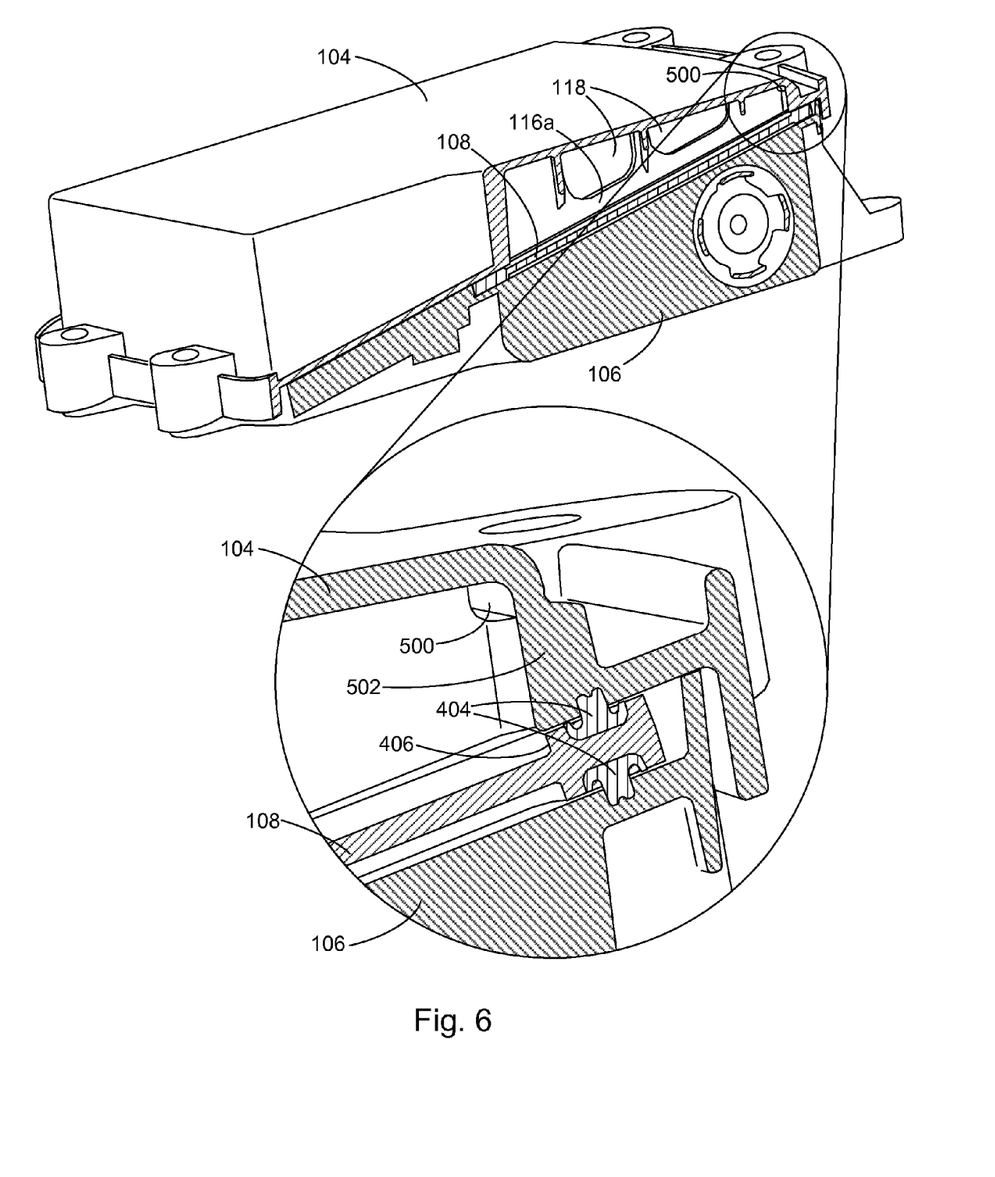
FIG. 6 is a cross-sectional perspective view of a coalescing filter assembly having a channel integrated into a partition thereof in accordance with certain embodiments of the present invention.

Referring now to FIGS. 5 and 6, liquid pooling in the second area 302 may be reduced by a channel 500 formed to enable liquid access between the access chamber 114 and the upstream chamber 110. Specifically, the channel 500 may be formed in a lowermost portion of the partition 116 separating the access chamber 114 from the upstream chamber 110. In one embodiment, the channel 500 substantially corresponds to a bottom edge 502 of the access chamber 114, thus optimizing drainage of liquid accumulated in the access chamber 114 to the upstream chamber 110.

In another embodiment, as best depicted by FIG. 6, the channel 500 may direct liquid from the access chamber 114 to a position in the upstream chamber 110 substantially adjacent its bottom edge. As discussed above, the bottom edge of the upstream chamber 110 may substantially correspond to the bottom edge 406 of the divider 108. Further, the bottom edges of each of the divider 108 and upstream chamber 110 may be substantially arc-shaped such that the channel 500 may cooperate with the weephole 400 to optimize efficient liquid drainage.

Specifically, liquid accumulated in the access chamber 114 may flow through the channel 500 and exit at a lower corner of the upstream chamber 110, where the lower corner of the upstream chamber 110 is upwardly disposed from the position of the weephole 400. The arc-shaped bottom edge of the upstream chamber 110 may then passively urge the liquid towards the weephole 400, from which it may enter the downstream chamber 112. In this manner, the channel 500 and weephole 400 combine to efficiently and effectively reduce liquid pooling upstream of the coalescing filter medium 126.

In some embodiments, the downstream chamber 112 may comprise a funnel or other design capable of directing the accumulated liquid to a drain 402 coupled thereto. Liquid may be channeled through the drain 402 to an external location or other location known to those in the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coalescing filter assembly to reduce liquid pooling therein, comprising:
   a coalescing filter having an upstream chamber and a downstream chamber, the coalescing filter adapted to filter a gaseous stream in a direction from the upstream chamber to the downstream chamber; and
   a weephole connecting the upstream chamber to the downstream chamber to enable liquid pooling in the upstream chamber to seep to the downstream chamber,
   wherein:
   said coalescing filter has a coalescing flow path therethrough from said upstream chamber to said downstream chamber;
   said weephole has a weephole flowpath therethrough from said upstream chamber to said downstream chamber in parallel with said coalescing flowpath;
   said gaseous stream flowing along said weephole flowpath does not flow through said coalescing filter along said coalescing flowpath;
   said gaseous stream flowing alone said coalescing flowpath passes from said upstream chamber through said coalescing filter to said downstream chamber without passing through said weephole;
   said gaseous stream flowing along said weephole flowpath passes from said upstream chamber through said weephole to said downstream chamber without passing through said coalescing filter.

2. The coalescing filter assembly of claim 1, further comprising a passageway connecting the upstream chamber to the downstream chamber.

3. The coalescing filter assembly of claim 2, wherein the passageway is adapted to accommodate the gaseous stream flowing from the upstream chamber to the downstream chamber.

4. The coalescing filter assembly of claim 1, further comprising a coalescing filter medium residing within the downstream chamber to filter the gaseous stream.

5. The coalescing filter assembly of claim 4, wherein the coalescing filter medium is adapted to coalesce liquid from the gaseous stream.

6. The coalescing filter assembly of claim 1, further comprising a drain communicating with the downstream chamber to drain liquid therefrom.

7. The coalescing filter assembly of claim 6, wherein the drain further empties the liquid to an engine crankcase.

8. The coalescing filter assembly of claim 1, wherein the weephole comprises a diameter in a range between about one and about five millimeters.

9. The coalescing filter assembly of claim 1, wherein the upstream chamber further comprises a perforated partition to slow a velocity of the gaseous stream as it enters the upstream chamber.

10. The coalescing filter assembly of claim 9, wherein the perforated partition comprises a channel to enable liquid to seep through the perforated partition to communicate with the weephole.

11. A coalescing filtration system to reduce liquid pooling therein, comprising:
    an upstream chamber;
    a downstream chamber;
    a passageway connecting the upstream chamber to the downstream chamber, the passage accommodating gases flowing from the upstream chamber to the downstream chamber;
    a filter medium residing within the downstream chamber to filter the gases flowing through the passageway; and
    a weephole connecting the upstream chamber to the downstream chamber to enable liquid pooling in the upstream chamber to seep from the upstream chamber to the downstream chamber,
    wherein:
    said coalescing filter has a coalescing flow path therethrough from said upstream chamber to said downstream chamber;
    said weephole has a weephole flowpath therethrough from said upstream chamber to said downstream chamber in parallel with said coalescing flowpath;
    said gaseous stream flowing along said weephole flowpath does not flow through said coalescing filter along said coalescing flowpath;
    said gaseous stream flowing along said coalescing flowpath passes from said upstream chamber through said coalescing filter to said downstream chamber without passing through said weephole;
    said gaseous stream flowing along said weephole flowpath passes from said upstream chamber through said weephole to said downstream chamber without passing through said coalescing filter.

12. The system of claim 11, further comprising a drain connecting the downstream chamber to an engine crankcase.

13. The system of claim 12, wherein the drain directs liquid collected in the downstream chamber to the engine crankcase.

14. The system of claim 11, wherein the upstream chamber further comprises a perforated partition to slow a velocity of the gases as they enter the upstream chamber.

15. The system of claim 14, wherein the perforated partition comprises a channel to enable liquid to seep through the perforated partition to communicate with the weephole.

16. A method to reduce liquid pooling in a coalescing filler assembly, comprising:
    providing an upstream chamber and a downstream chamber;
    connecting, via a passageway, the upstream chamber to the downstream chamber;
    engaging within the downstream chamber a filtration medium to filter gases flowing through the passageway; and
    forming within the upstream chamber a weephole to enable liquid pooling in the upstream chamber to seep from the upstream chamber to the downstream chamber,
    wherein:

said coalescing filter has a coalescing flow path therethrough from said upstream chamber to said downstream chamber;

said weephole has a weephole flowpath therethrough from said upstream chamber to said downstream chamber in parallel with said coalescing flowpath;

said gaseous stream flowing along said weephole flowpath does not flow through said coalescing filter along said coalescing flowpath;

said gaseous stream flowing along said coalescing flowpath passes from said upstream chamber through said coalescing filter to said downstream chamber without passing through said weephole;

said gaseous stream flowing along said weephole flowpath passes from said upstream chamber through said weephole to said downstream chamber without passing through said coalescing filter.

17. The method of claim 16, further comprising coupling to the downstream chamber a drain to enable liquid collected in the downstream chamber to drain therefrom.

18. The method of claim 16, wherein the weephole comprises a diameter in a range between about one and about five millimeters.

19. The method of claim 16, further comprising:

partitioning the upstream chamber to slow a velocity of gases entering the upstream chamber; and forming within the partition to channel to enable liquid to seep through the partition to communicate with the weephole.

20. A method to reduce liquid pooling in a coalescing filter assembly, comprising:

introducing a gaseous stream to an upstream chamber in a coalescing filter assembly;

directing the gaseous stream from the upstream chamber to a downstream chamber via a passageway connecting the upstream chamber to the downstream chamber;

filtering the gaseous stream flowing through the passageway; and enabling liquid pooling in the upstream chamber to seep through a weephole connecting the upstream chamber to the downstream chamber, wherein:

said coalescing filter has a coalescing flow path therethrough from said upstream chamber to said downstream chamber;

said weephole has a weephole flowpath therethrough from said upstream chamber to said downstream chamber in parallel with said coalescing flowpath;

said gaseous stream flowing alone said weephole flowpath does not flow through said coalescing filter along said coalescing flowpath;

said gaseous stream flowing along said coalescing flowpath passes from said upstream chamber through said coalescing filter to said downstream chamber without passing through said weephole;

said gaseous stream flowing along said weephole flowpath passes from said upstream chamber through said weephole to said downstream chamber without passing through said coalescing filter.

\* \* \* \* \*

UNITED STATES PATENT AND TRADEMARK OFFICE
CERTIFICATE OF CORRECTION

| | |
|---|---|
| PATENT NO. | : 7,582,130 B2 |
| APPLICATION NO. | : 11/279849 |
| DATED | : September 1, 2009 |
| INVENTOR(S) | : Ng et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this

Fourteenth Day of September, 2010

David J. Kappos
*Director of the United States Patent and Trademark Office*